(12) United States Patent
Andersen

(10) Patent No.: US 10,010,894 B2
(45) Date of Patent: Jul. 3, 2018

(54) APPARATUS FOR RETARDING ROTARY NOZZLE SPEED

(71) Applicant: STONEAGE, INC., Durango, CO (US)

(72) Inventor: Colton Andersen, Durango, CO (US)

(73) Assignee: Stoneage, Inc., Durango, CO (US)

( * ) Notice: Subject to any disclaimer, the term of this patent is extended or adjusted under 35 U.S.C. 154(b) by 741 days.

(21) Appl. No.: 14/469,110

(22) Filed: Aug. 26, 2014

(65) Prior Publication Data

US 2015/0083536 A1 Mar. 26, 2015

Related U.S. Application Data

(60) Provisional application No. 61/880,316, filed on Sep. 20, 2013.

(51) Int. Cl.
| | |
|---|---|
| *B05B 3/00* | (2006.01) |
| *F16D 57/00* | (2006.01) |
| *B05B 3/06* | (2006.01) |

(52) U.S. Cl.
CPC ............... *B05B 3/005* (2013.01); *B05B 3/06* (2013.01); *F16D 57/007* (2013.01)

(58) Field of Classification Search
CPC ...... F16F 2232/06; F16F 15/0235; F16F 9/12; F16F 9/14; F16D 57/007; F16D 57/02; F16C 17/18; F16C 17/105; F16C 17/026; B05B 15/005; B05B 13/069; B05B 13/0636; B05B 3/0427; B05B 3/005; B05B 3/06; B05B 3/026; B05B 3/001; B05B 3/002; B05B 3/003
USPC ....... 188/293, 306, 310, 308, 309, 294, 252, 188/82.1, 82.5, 184, 185, 322.5, 291
See application file for complete search history.

(56) References Cited

U.S. PATENT DOCUMENTS

| | | | | |
|---|---|---|---|---|
| 1,521,583 | A | * | 12/1924 | Whitcomb ............... F16F 7/06 16/82 |
| 3,272,289 | A | * | 9/1966 | Vermont ............. F16F 15/0235 188/290 |
| 4,679,666 | A | | 7/1987 | Brems |
| 5,400,878 | A | | 3/1995 | D'Anna et al. |
| 5,909,848 | A | * | 6/1999 | Zink ...................... B05B 3/003 188/184 |
| 5,916,068 | A | | 6/1999 | Chisholm et al. |

(Continued)

OTHER PUBLICATIONS

International Search Report and Written Opinion, dated Dec. 3, 2014, from corresponding International Patent Application No. PCT/US2014/052718.

*Primary Examiner* — Robert Siconolfi
*Assistant Examiner* — San Aung
(74) *Attorney, Agent, or Firm* — Greenberg Traurig, LLP

(57) ABSTRACT

An apparatus for retarding rotation of a nozzle includes a hollow housing, a rotary shaft within the housing, a rotatable rotor on the rotary shaft free to move axially along the shaft, and a cam assembly coupling the rotor and shaft together in the housing such that rotor rotation on the shaft causes the cam assembly to displace the rotor axially on the shaft in a first direction. A set of springs on the shaft biases the rotor in a second direction opposite the first direction on the shaft. Finally, a viscous fluid disposed between the rotor and the housing generates a drag on rotor rotation with the shaft. Relative rotation of the rotor with respect to the shaft in conjunction with a variable gap between the rotor and housing are used to slow and thus control rotary nozzle speed.

19 Claims, 6 Drawing Sheets

(56) References Cited

U.S. PATENT DOCUMENTS

| | | | |
|---|---|---|---|
| 5,964,414 A | 10/1999 | Hardy et al. | |
| 8,439,172 B2* | 5/2013 | Lee | A47K 13/12 |
| | | | 16/330 |
| 2002/0153432 A1* | 10/2002 | McKenzie | B05B 3/0431 |
| | | | 239/237 |
| 2002/0185344 A1* | 12/2002 | Mills | F16D 55/02 |
| | | | 188/184 |
| 2004/0164178 A1 | 8/2004 | Kah, Jr. | |
| 2005/0109541 A1* | 5/2005 | Marvin | B05B 3/002 |
| | | | 175/67 |
| 2006/0054716 A1 | 3/2006 | Lutzki | |
| 2009/0151121 A1* | 6/2009 | Lin | E05F 3/20 |
| | | | 16/321 |
| 2011/0108636 A1* | 5/2011 | Wright | B05B 3/002 |
| | | | 239/251 |
| 2011/0198126 A1* | 8/2011 | Swietlik | E21B 17/07 |
| | | | 175/55 |
| 2012/0204368 A1 | 8/2012 | Zink | |
| 2012/0205405 A1 | 8/2012 | Zink et al. | |

* cited by examiner

APPARATUS FOR RETARDING ROTARY NOZZLE SPEED

CROSS REFERENCE TO RELATED APPLICATIONS

This application claims the benefit of priority of U.S. Provisional Patent Application Ser. No. 61/880,316, filed Sep. 20, 2013, the disclosure of which is incorporated herein by reference in its entirety.

BACKGROUND OF THE DISCLOSURE

The present disclosure is directed to high pressure fluid rotary nozzle systems. In particular, embodiments of the present disclosure are directed to an apparatus for retarding the rotational speed of such rotary nozzles.

A high pressure rotary nozzle and tractor device is disclosed in US Patent Application Publications 2012/0204368 and 2012/0205405. Such nozzles and tractor devices are particularly well suited to industrial uses where the operating parameters can be in the range of 1,000 to 40,000 psi, rotating speeds of up to 1000 rpm or more and flow rates of 2 to 50 gpm may be needed.

In order to control the rotational speed of the rotary nozzle and tractor devices, there is a need for a speed control to retard the speed of the tool to keep the rpm's in a desired range for specific cleaning applications. There are several different speed control mechanisms, one of which, described in U.S. Pat. No. 5,964,414 utilizes viscous fluid within stacked radial ball bearings within a sealed bearing chamber in the body rotatably supporting the shaft. Another mechanism includes a viscous fluid confined within a thin gap that separates two components where one component is rotated and the other is stationary. This speed control style can handle a limited input torque range based on the set distance of the gap. This limit in torque range requires that other components on the rotary nozzle be changed to accommodate major variations in flow and pressure. What is still needed is an apparatus that can be utilized over a wide torque range to reliably control rotational speed.

SUMMARY OF THE DISCLOSURE

The present disclosure directly addresses such needs. The present disclosure addresses this limited torque range by offering a solution that involves permitting the distance of the gap between relatively rotating components connected to a rotary nozzle tool to vary as a function of tool torque, affecting the rotational speed to the tool, thus increasing the operational torque range of the tool.

One exemplary embodiment of such an apparatus for retarding rotation of a nozzle includes a hollow housing, a rotary shaft within the housing, a rotatable rotor on the rotary shaft free to move axially along the shaft, and a cam assembly holding the rotor and shaft together such that rotor rotation on the shaft causes the cam assembly to displace the rotor axially on the shaft in a first direction. A set of springs on the shaft biases the rotor in a second direction opposite the first direction on the shaft. Finally, a viscous fluid disposed between the rotor and the housing generates a drag on rotation of the rotor about the shaft.

In one preferred embodiment, the rotary shaft and the hollow housing have complementary frusto-conical shapes. As speed increases, the cams of the cam assembly rotate and separate, causing the shaft to move forward, reducing the gap between the shaft and the hollow housing, increasing the resistive drag force of the fluid on the rotating shaft, thus slowing it down until an equilibrium is again reached between spring force and the viscous drag force on the rotor. Conversely, as speed decreases, the spring forces push the shaft rearward, closing the cams and increasing the viscous fluid volume in the gap thus decreasing viscous drag until equilibrium is again reestablished. The combination of these changes substantially increases the useable range of torques that can be handled by the speed retarding apparatus.

An embodiment of a device for retarding rotational speed of a rotary nozzle in accordance with this disclosure includes a hollow housing having an internal surface portion concentric about an axis through the housing, an elongated tubular shaft having a portion rotatably carried within the housing for rotation about the axis and an end portion extending out of the housing, an elongated rotor having an exterior surface shape complementary to the internal surface portion of the housing slidably mounted on the portion of the shaft within the housing, a cam assembly coupled between the rotor and the shaft to cause axial movement of the rotor upon rotation of the rotor about the shaft, and a viscous fluid between the rotor and the internal surface portion of the housing.

The cam assembly preferably includes a rotor follower cam ring disposed about the shaft and fastened to the rotor. This follower cam ring has a plurality of axially extending projections. The assembly also has a progressive cam ring fastened to the shaft. This progressive cam ring has a plurality of ramps each facing one of the axially extending projections associated with the follower cam ring.

The internal surface portion of the housing has a tapered shape and is preferably a frusto-conical tapered shape. The external surface of the rotor may include a peripheral helical groove and the helical groove may have a variable depth that preferably increases from one end of the rotor to an opposite end of the rotor.

An embodiment of a device for retarding rotational speed of a rotary nozzle may include a hollow housing having an internal surface portion concentric about an axis through the housing, an elongated tubular shaft having a portion rotatably carried within the housing for rotation about the axis and having an end portion extending out of the housing, wherein the end portion of the shaft is connectable to a rotary nozzle, an elongated rotor having an exterior surface shape complementary to the internal surface portion of the housing slidably mounted on the portion of the shaft within the housing, a cam assembly coupled between the rotor and the shaft to cause axial movement of the rotor upon rotation of the rotor about the shaft, and a viscous fluid within the housing around the shaft and between the rotor and the internal surface portion of the housing.

The internal surface portion of the housing preferably has a tapered shape. More preferably this tapered shape may be a frusto-conical tapered shape. The external surface of the rotor preferably has a peripheral helical groove that may have a variable depth that increases from one end of the rotor to an opposite end of the rotor.

The device may include a spring member comprising one or more wave springs positioned between a front bearing on the shaft and the rotor. The cam assembly may include a progressive cam ring fastened to the shaft and a follower cam ring fastened to the rotor. The cam ring preferably has a plurality of ramps spaced around the ring and the follower cam ring has a plurality of projections each engaging one of the plurality of ramps.

Further features, advantages and characteristics of the embodiments of this disclosure will be apparent from read-

DETAILED DESCRIPTION

Figure 1:
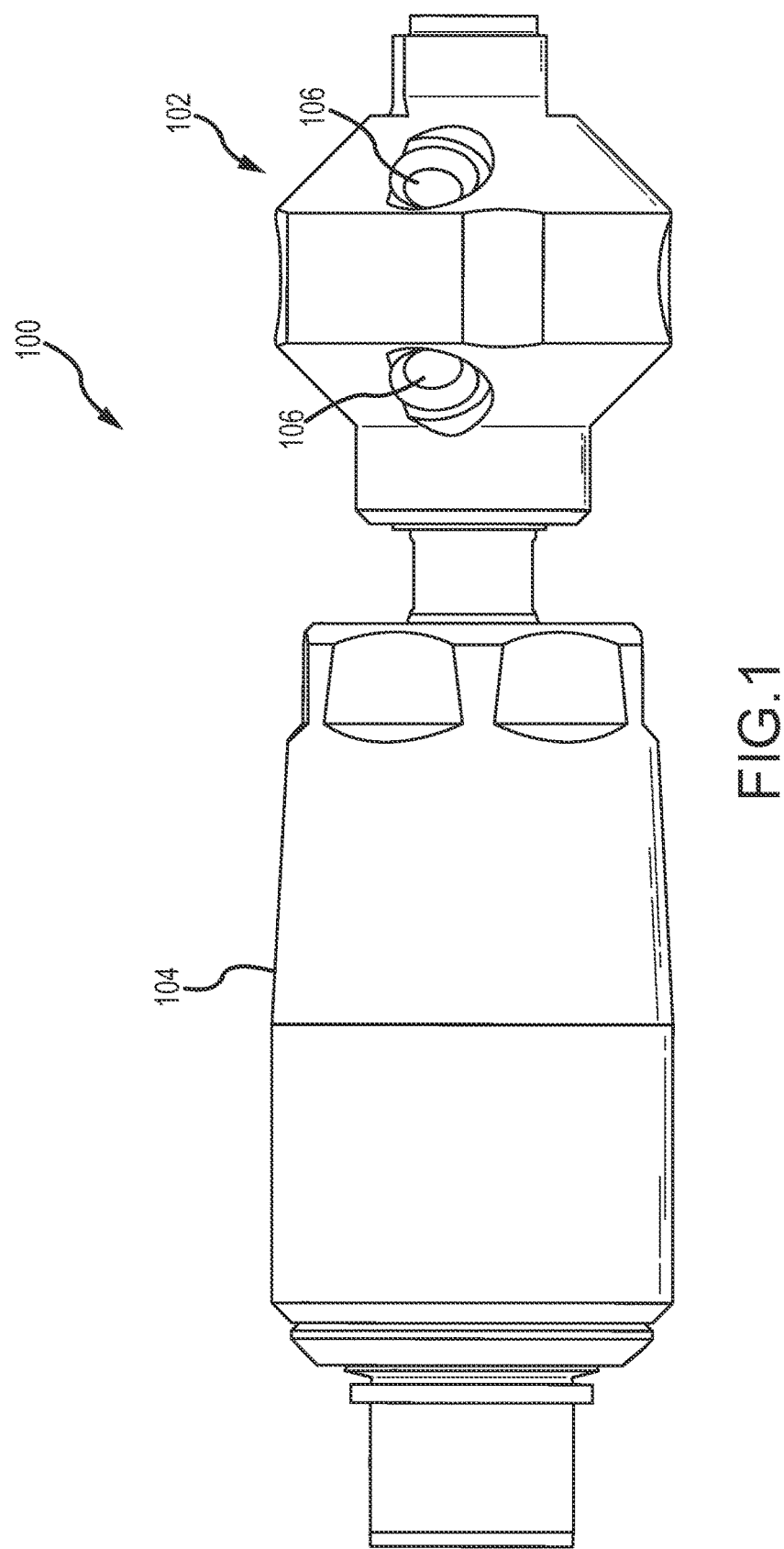
FIG. 1 is a longitudinal side view of an assembled speed retarding device connected to a rotary high pressure nozzle.
Figure 2:
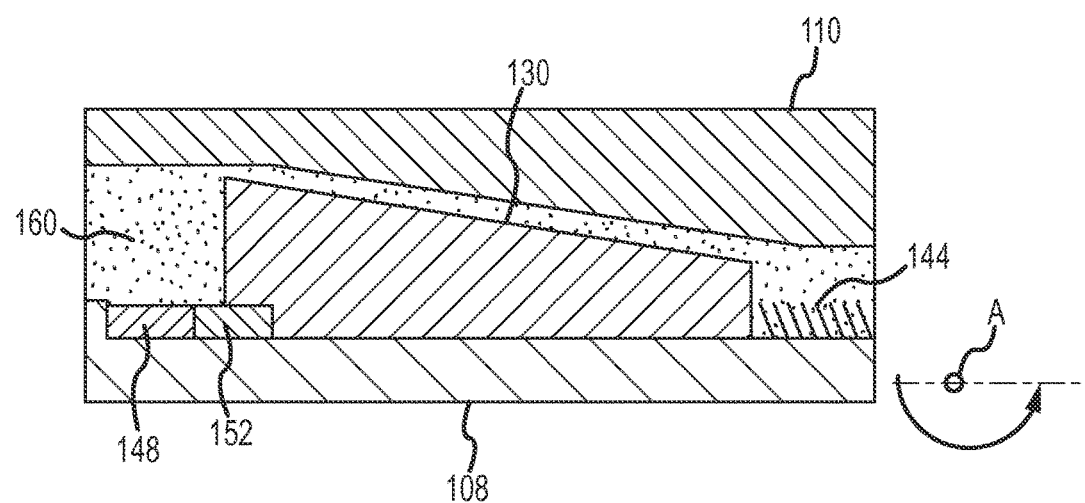
FIG. 2 is a partial section schematic diagram of the retarding device in accordance with the present disclosure shown in FIG. 1.
Figure 3:
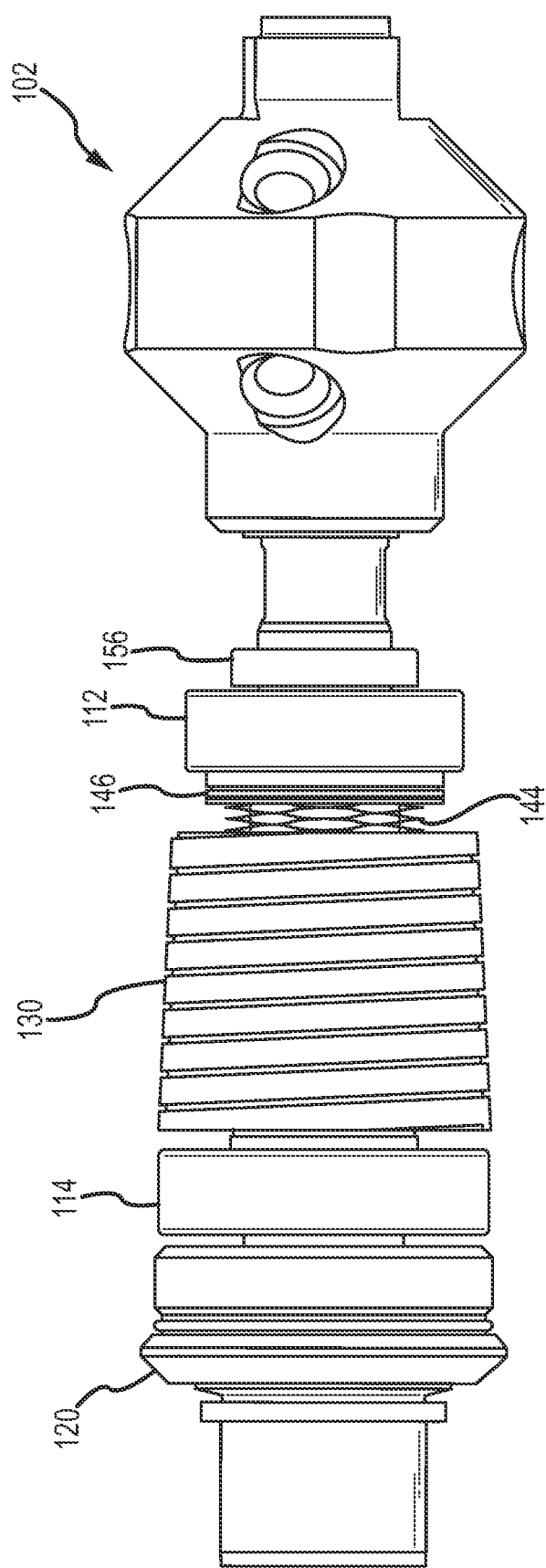
FIG. 3 is a longitudinal side view of the assembled speed retarding device connected to a rotary high pressure nozzle as shown in FIG. 1 without the outer device housing.

An assembled exemplary embodiment of a speed controlled rotary nozzle assembly 100 in accordance with the present disclosure is shown in a longitudinal side view in FIG. 1. The assembly 100 includes a rotary nozzle head 102 fastened to a speed limiting apparatus or device 104 in accordance with the present disclosure. The rotary nozzle head 102 preferably has a plurality of radially offset nozzle ports 106 for generating a rotational torque about the longitudinal axis A of the assembly 100 when high pressure fluid is pumped through the assembly 100 and ejected out of the nozzle ports 106.

The speed limiting device 104 includes a tubular shaft 108 rotatably supported within a hollow housing 110. One end of the tubular shaft 108 extends from one end of the housing 110 and is supported by a roller journal bearing 112 in the housing 110. The rear end of the tubular shaft 108 is rotatably supported in the housing 110 by a rear roller bearing 114 mounted within the housing 110. The rear end of the tubular shaft 108 has an end face 116 that abuts against a unitary high pressure seal cartridge 118 carried by an inlet nut 120 that is threaded into the rear end of the housing 110. The unitary high pressure seal cartridge 118 is preferably a replaceable rotary seal, such as is disclosed in U.S. Pat. No. 8,573,599, incorporated herein by reference. This inlet nut 120 is in turn fastened to a high pressure hose (not shown).

Figure 5:
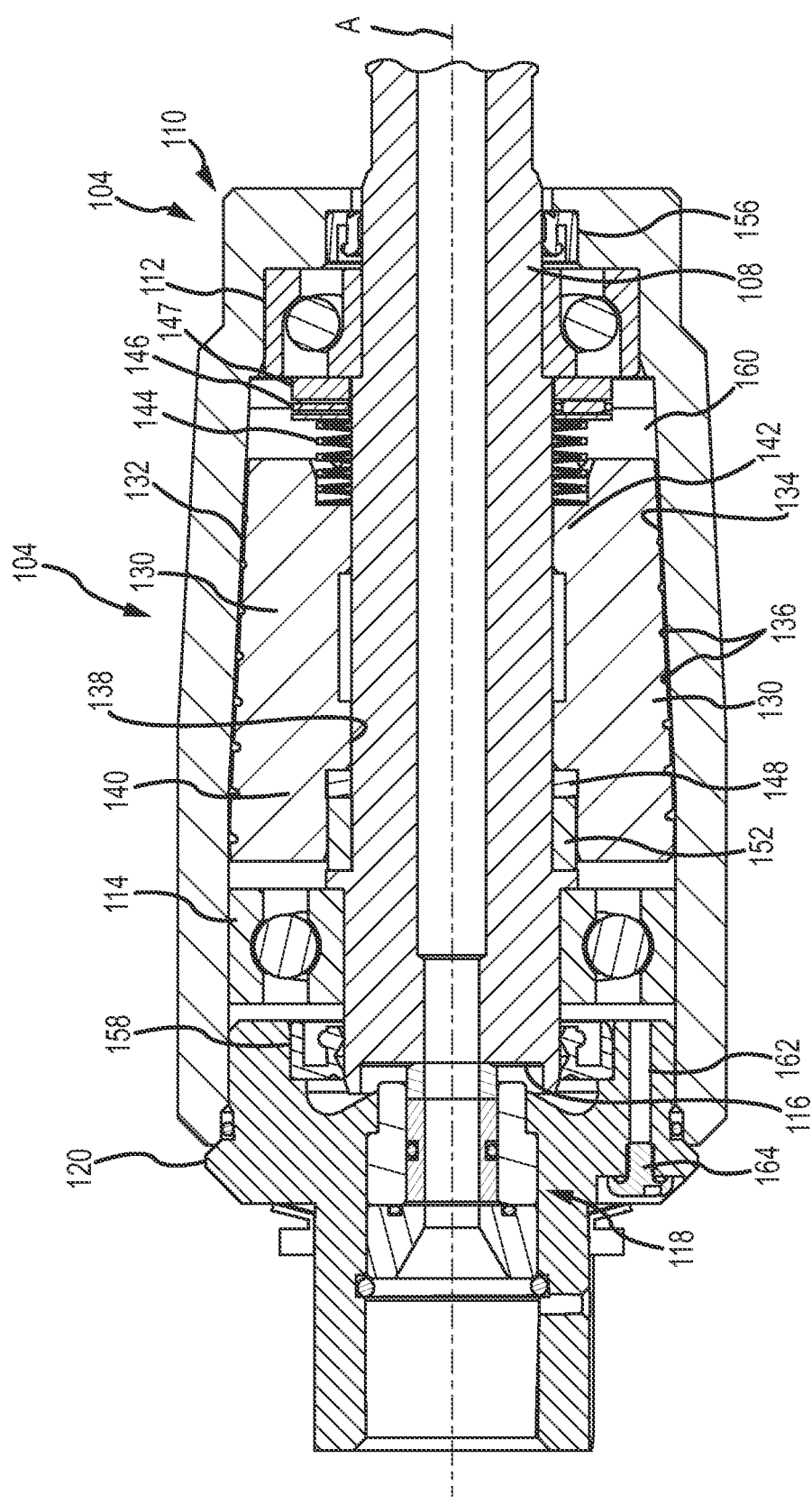
FIG. 5 is an axial cross sectional view of the assembled speed retarding device shown in FIG. 1.

As is shown in FIG. 5, speed limiting device 104 also includes a tubular rotor 130 that is carried on the shaft 108. This tubular rotor 130 preferably has an outer surface shape 132 complementary to an inside surface 134 of the housing 110. Preferably the complementary surface shapes 132 and 134 are tapered and more preferably frusto-conical. Preferably the outer surface 132 has a spiral helical groove 136 extending therearound from a forward to a rearward end of the rotor 130. The depth of the helical groove increases as the groove progresses from the forward end of the device 104 to the rear of the rotor 130. Alternatively the groove 136 may be formed in the inner surface of the housing 110 rather than on the outer surface 132 of the rotor 130.

The rotor 130 has an axial bore 138 therethrough that is sized to receive the tubular shaft 108 therethrough, and has an inwardly directed rear annular flange 140 and a forward inwardly directed annular flange 142. These annular flanges 140 and 142 have a close tolerance to the outer radius of the tubular shaft 108, Mounted around a front end of the shaft 108 and abutting the annular flange 142 is a stack of wave springs 144 that are free to rotate about the shaft 108. A thrust bearing 146 around the shaft 108 is sandwiched between the wave spring stack 144 and the forward roller bearing 112.

A rotor cam ring 148 is disposed around the shaft 108 and keyed to the rotor 130 and abuts against the rear annular flange 140 of the rotor 130. This rotor cam ring 148 is thus sandwiched between the shaft 108 and recessed within the rear end of the rotor 130 This rotor follower cam ring 148 has 3 or 4 axially extending and radially equally spaced apart projections 150 that extend rearward toward the inlet nut 120.

Figure 4:
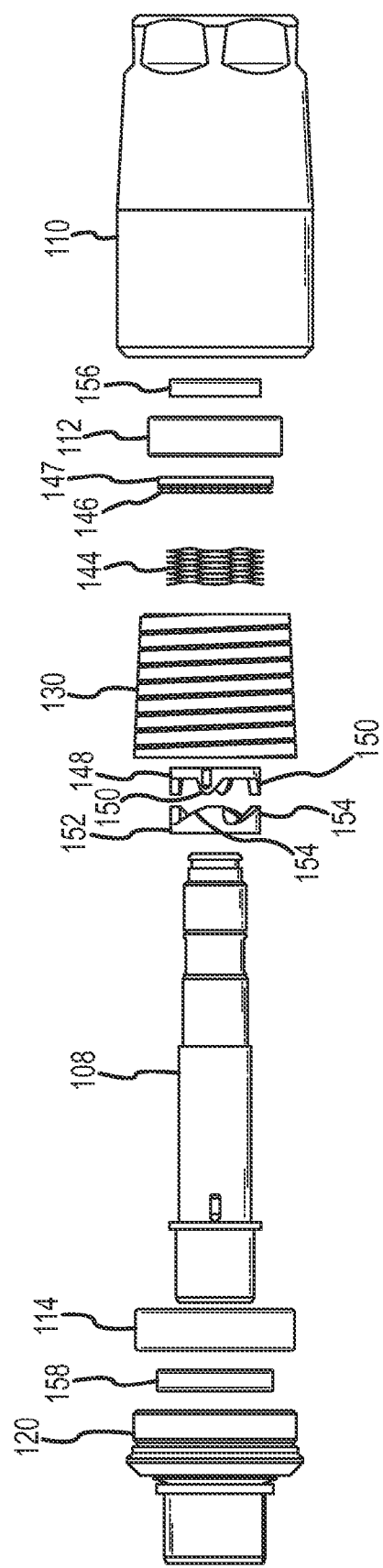
FIG. 4 is an exploded side view of the speed retarding device shown in FIG. 1.

Also mounted on and keyed to the shaft 108 is a shaft progressive cam ring 152. This progressive cam ring 152 has a plurality of spaced peripheral ramps 154 that each engage with one of the rotor follower cam ring projections 150. In operation, normally the rotor and shaft rotate together as the nozzle 106 rotates. However, as the speed increases, the viscous fluid exerts a drag on the rotor 130. Due to this drag, as the rotor 130 rotates about the shaft 108, the projections 150 ride up or down along the ramps 154, depending on the drag amount, to axially move the rotor 130. As shown in FIG. 4, the shaft 108 and rotor 130 generally rotate together counterclockwise viewed from the rear. if the rotor 130 rotates or lags less counterclockwise as viewed from the rear of the assembly 100, the follower cam ring 148, fastened to the rotor 130, is pushed to the right, moving the rotor 130 axially forward, compressing the rotor 130 against the wave spring stack 144.

Stated another way, the motion of the rotor 130 with respect to the shaft 108 is caused by the drag force that is created by viscous fluid inside of the fluid gap between the housing 110 and rotor 130 when the shaft and rotor are rotated inside of the housing 110 (or vice versa). Rotation of the shaft is initiated by the torque from the offset jets or ports 106 on the nozzle head 102 which is attached to the shaft 108. As the rotational speed, i.e. revolutions per minute (rpm), of the tool increases, the drag force of the viscous fluid in the fluid gap increases. This puts a rotational stress between the rotor 130 and the shaft 108. This rotational stress, or torque, between the rotor 130 and shaft 108 acts on the actuator cams 148/150 and 152/154 that interconnect them and forces the two cam rings 148 and 152 axially apart, driving the rotor 130 axially forward on the shaft 108.

Thus, the multi-stacked wave return spring 144 serves to oppose the cam actuation, exerting a force attempting to return the rotor 130 back to its original rest position. Once the viscous rotational drag force is great enough, the force in the cams overcomes opposing return spring force, the rotor 130 begins to rotate about the shaft 108 and the cam mechanism drives the rotor 130 forward, i.e, to the right in FIG. 4, on the shaft 108 and thus into the housing 110. Once the force exerted by the cams matches the spring force, the device 104 reaches equilibrium and the rotor 130 stays in a stationary position.

In addition, as the rotor 130 moves forward during rotation of the rotor and shaft together, its taper and the internal taper of the housing 110 come closer together, causing the fluid gap between the rotor 130 and the housing 110 to become smaller until the rotor 130 engages the thrust bearing 146. Viscous drag force is inversely proportional to this gap size; therefore, as the fluid gap decreases, the viscous drag force increases and serves to maintain the tool speed within a specified range. By changing the spring rate of the return spring stack 144, the desired speed range of the tool, i.e. device 104, can be adjusted. If the spring rate is reduced, it takes less force to overcome, and the rotor 130 will move forward sooner causing the tool to rotate slower. Inversely, if the spring rate is increased, the tool will rotate faster. The rotor 130 has a limited range of motion and is stopped by the thrust bearing 146 at a minimum gap position preventing any mechanical interference between the rotor 130 and the housing 110. Furthermore, engagement of the rotor 130 with the thrust bearing 146 prevents the follower cam projections 150 from moving beyond the ramps 154 on the progressive cam ring 152 fastened to the shaft 108.

At the forward end of the housing 110 is an annular seal ring 156 around the shaft 108 that prevents ingress of contaminants into the housing 110. A similar annular seal 158 is press fit into the inlet nut 120 at the rear end of the housing 110 so as to prevent high pressure water or other fluid from entering the housing 110 around the rear end of the shaft 108. This seal ring 158 also prevents viscous fluid 160 in the housing 110 from escaping. A threaded port 162 closed by a threaded plug 164 permits filling of the cavity within the housing 110 with the viscous fluid 160. A preferred viscous fluid in one exemplary embodiment of the retarder device of the present disclosure is a pure silicone fluid having a viscosity of 2000 cSt.

Figure 6:
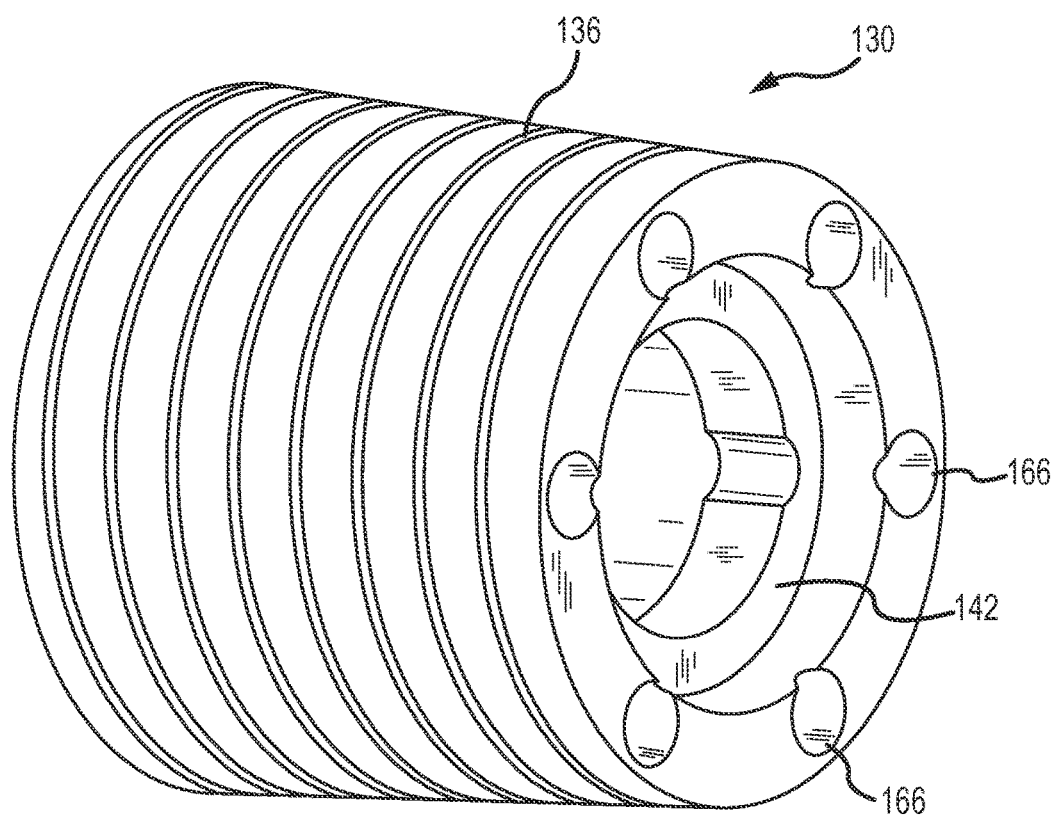
FIG. 6 is a separate perspective view of the rotor utilized in the device shown in FIGS. 1-5.

A separate perspective view of the rotor 130 is shown in FIG. 6. This rotor 130 is a frusto-conical sleeve that has inwardly directed flanges 140 and 142 which ride against the shaft 108 as described above. Preferably a single helical groove 136 spirals around the tapered exterior surface 132 of the rotor 130. As can readily be seen in FIGS. 5 and 6, the depth of this groove 136 deepens as it approaches the rear of the rotor 130. In addition, the rotor 130 has a plurality of radially spaced bores 166 that extend parallel to the central axis through rotor 130. These bores 166 provide a return path for fluid flowing rearwardly through the gap between the housing 110 and the rotor 130 such that during rotary nozzle operation there is a constant circulation of fluid within the device 104.

Many changes may be made to the device, which will become apparent to a reader of this disclosure. For example, the rotor 130 may be configured with or without a helical external groove as is shown in FIG. 6. Such a helical groove may be a single groove as shown. Alternatively a set of helical grooves may be formed on the outer surface of the rotor. The purpose of the helical groove(s) is to help pull the viscous fluid into the thin gap between the housing and rotor components, which increases the efficiency of this speed control style. The cam ring assembly 148/152 may be separate elements as shown or may be integrally incorporated into the return spring stack 144. The device 104 may also be configured to permit external adjustment of the initial spring compression thereby providing multiple operational rpm ranges for the given torque range and without disassembly of the speed retarder apparatus.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. An apparatus for retarding rotation of a rotary nozzle comprising:
   a hollow housing;
   a rotary shaft within the housing;
   a rotatable rotor on the rotary shaft free to move axially along the shaft;
   a cam assembly holding the rotor and shaft together such that rotor rotation on the shaft causes the cam assembly to displace the rotor axially on the shaft in a first direction, wherein the cam assembly comprises:
      a rotor cam ring disposed about the shaft and fastened to the rotor, the cam ring having a plurality of axially extending projections; and
      a shaft cam ring fastened to the shaft having a plurality of ramps each facing one of the axially extending projections;
   a set of springs on the shaft biasing the rotor in a second direction opposite the first direction on the shaft; and
   a viscous fluid disposed between the rotor and the housing for generating a drag on rotation of the rotor about the shaft.

2. The apparatus of claim 1 wherein the housing has an internal portion shaped complementary to an external shape of the rotor.

3. The apparatus of claim 2 wherein the complementary shapes are frusto-conical.

4. A device for retarding rotational speed of a rotary nozzle, the device comprising:
   a hollow housing having an internal surface portion cocentric about an axis through the housing;
   an elongated tubular shaft having a portion rotatably carried within the housing for rotation about the axis and an end portion extending out of the housing, wherein the end portion of the shaft is connectable to a rotary nozzle;
   an elongated rotor having an exterior surface shape complementary to the internal surface portion of the housing slidably mounted on the portion of the shaft within the housing;
   a cam assembly coupled between the rotor and the shaft to cause axial movement of the rotor upon rotation of the rotor about the shaft, wherein the cam assembly comprises:
      a rotor cam ring disposed about the shaft and fastened to the rotor, the cam ring having a plurality of axially extending projections; and
      a shaft cam ring fastened to the shaft having a plurality of ramps each facing one of the axially extending projections; and
   a viscous fluid between the rotor and the internal surface portion of the housing.

5. The device according to claim 4 wherein the internal surface portion of the housing has a tapered shape.

6. The device according to claim 4 wherein the internal surface portion of the housing has a frusta-conical tapered shape.

7. The device according to claim 6 wherein the external surface of the rotor has a peripheral helical groove.

8. The device according to claim 7 wherein the helical groove has a variable depth.

9. The device according to claim 8 wherein the depth increases from one end of the rotor to an opposite end of the rotor.

10. A device for retarding rotational speed of a rotary nozzle, the device comprising:
    a hollow housing having an internal surface portion concentric about an axis through the housing;
    an elongated tubular shaft having a portion rotatably carried within the housing for rotation about the axis and having an end portion extending out of the housing, wherein the end portion of the shaft is connectable to a rotary nozzle;

an elongated rotor having an exterior surface shape complementary to the internal surface portion of the housing slidably mounted on the portion of the shaft within the housing;

a cam assembly coupled between the rotor and the shaft to cause axial movement of the rotor upon rotation of the rotor about the shaft, wherein the cam assembly comprises:

a rotor cam ring disposed about the shaft and fastened to the rotor, the cam ring having a plurality of axially extending projections; and a shaft cam ring fastened to the shaft having a plurality of ramps each facing one of the axially extending projections; and a viscous fluid within the housing around the one portion of the shaft between the rotor and the internal surface portion of the housing.

11. The device according to claim 10 wherein the internal surface portion of the housing has a tapered shape.

12. The device according to claim 10 wherein the internal surface portion of the housing has a frusta-conical tapered shape.

13. The device according to claim 12 wherein the external surface of the rotor has a peripheral helical groove.

14. The device according to claim 13 wherein the helical groove has a variable depth.

15. The device according to claim 14 wherein the depth increases from one end of the rotor to an opposite end of the rotor.

16. The device according to claim 10 wherein the rotor is a frusta-conical sleeve having a central axial bore receiving the shaft therethrough.

17. The device according to claim 10 further comprising a spring member on the shaft axially biasing the rotor toward the cam assembly on the shaft.

18. The device according to claim 17 wherein the spring member comprises one or more wave springs positioned between a front bearing on the shaft and the rotor.

19. The device according to claim 17 wherein the cam assembly comprises a progressive cam ring fastened to the shaft and a follower cam ring fastened to the rotor, the progressive cam ring having a plurality of ramps spaced around the ring and the follower cam ring having a plurality of projections each engaging one of the plurality of ramps.

* * * * *